UNITED STATES PATENT OFFICE.

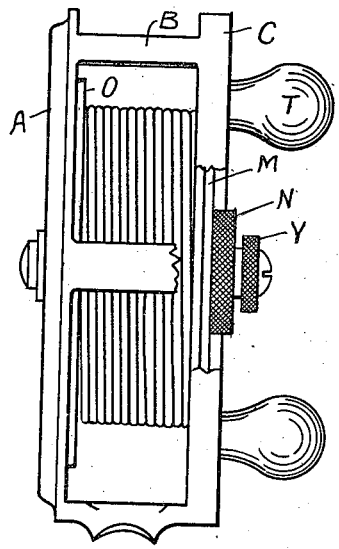
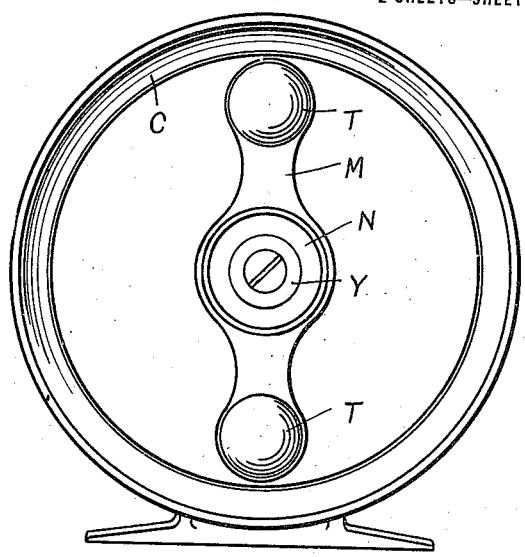
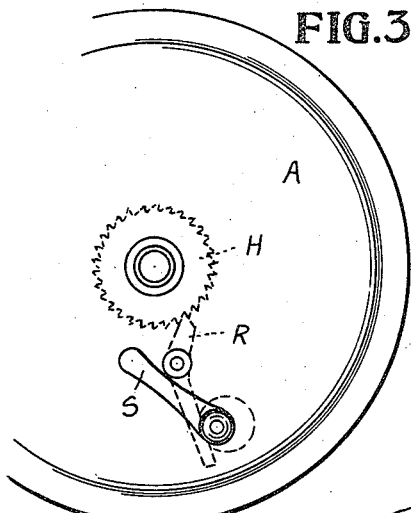
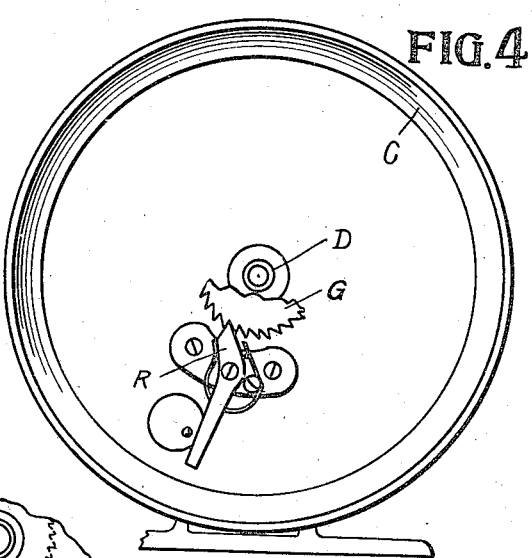
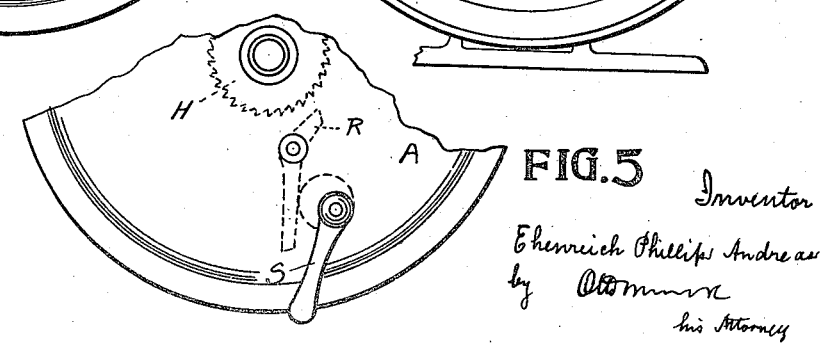

EHENREICH PHILLIP ANDREAS, OF LEURA, NEW SOUTH WALES, AUSTRALIA.

FISHING-REEL.

1,281,261.

Specification of Letters Patent.

Patented Oct. 15, 1918.

Application filed January 30, 1918. Serial No. 214,452.

*To all whom it may concern:*

Be it known that I, EHENREICH PHILLIP ANDREAS, subject of the King of Great Britain and Ireland, residing at Leuralla, Leura, New South Wales, Australia, have invented new and useful Improvements in Fishing-Reels, of which the following is a specification.

This invention relates to line reels for fishing rods. It consists in means for releasing the drum to permit it to spin unretarded so that the line may be permitted to run out freely without reversing the winding crank; in means for connecting the winding crank to the drum including a resilient friction clutch, by which the line tension may be regulated and limited, so that the line may pay out whenever the tension upon it exceeds the adjusted maximum, while the winding crank is being turned continuously to rewind it into the drum; in means for applying light retardation to the drum when it is released to check spinning and prevent overrunning, to facilitate casting the line; in certain improvements in the control mechanism to facilitate manipulation; and in other details of construction which are hereinafter fully described.

The winding crank is frictionally engaged to the drum through a cork disk friction clutch which is controlled by an adjusting nut by means of which the clutch tension may be varied either when the drum is at rest or while the line is paying out. The winding crank may be turned positively to wind on the line and may also be turned positively while the drum is idle or is turning negatively owing to the excessive pull on the line. The drive clutch which brakes the drum rotation and connects the drum to the winding crank may be engaged with any required degree of slip tension, or may be entirely freed, so that in the former case the line may be wound on to the reel by rotating the winding crank, the clutch slipping when the tension on the line exceeds the slip tension to which the clutch is adjusted, and in the latter case the line is permitted to run out freely and unretarded. A light tension casting brake is provided independently of the drive clutch for applying a light braking effect to the drum so that while it may turn quite freely to allow the line to pay out, it will not spin and backwind or tangle the line during casting. Adjustment of the friction clutch tension and of the casting brake tension are effected by means of milled nuts or wing nuts on the drive side of the reel. A finger lever on the inner side of the housing controls a pawl which is engaged with the sleeve on which the drum is mounted, and when engaged prevents reverse rotation of the sleeve. When the tension casting brake is used for controlling the reverse spinning of the drum in casting the line, this pawl is disengaged and the drum may then rotate freely subject to the adjusted retardation imposed by the casting brake.

The drum is housed in a lantern frame and is rotatable on a sleeve which in turn is rotatably mounted on a fixed hollow spindle concentrically in the housing; the core of this spindle forms a pocket for lubricating oil. The winding crank is fixed on the end of the sleeve and operated to turn the drum and sleeve positively when the drive clutch is engaged. The drive clutch comprises a metal washer set against one cheek of the drum, a cork washer set against the other cheek of the drum, a flange on the sleeve forming an abutment for the cork washer, and a thumbnut on the other end of the sleeve arranged to apply pressure to force the washers against the drum cheeks and so frictionally engage the drum to the sleeve. The edge of the sleeve flange is double toothed. A click pawl mounted on the cheek of the drum engages one toothed edge of the sleeve flange; this pawl has an almost negligible braking effect, and permits either positive or negative movement of the drum, the rate of the drum's rotation being suggested by the pitch of the sound made by the click pawl running over the detent. The other detent edge of the flange is also engaged by a releasable spring held pawl which is mounted on the housing; said pawl when engaged permits positive rotation of the sleeve, but prevents negative rotation of the sleeve and winding crank; it may be disengaged by means of a finger lever on the back of the housing, and, when it is disengaged, the sleeve carrying the drum and the winding crank, are free to rotate on the hollow spindle.

The free rotation of the sleeve on the hollow spindle is however controllable by a light friction brake which consists of a small cork washer which contacts with the outer side of the sleeve flange, and a tension adjusting nut which operates to compress said braking washer between said sleeve flange and a fixed abutment which is preferably formed by a flange on the hollow spindle.

In the accompanying drawings, Figure 1 is an end elevation of the reel complete, with a portion of the frame broken away to display the clutch and brake adjustment nuts;

Fig. 2 is a side elevation of the winding crank side of the reel;

Fig. 3 is a partial rear side elevation showing the release pawl and finger lever control for same;

Fig. 4 is an elevational view on the inside of the frame corresponding with Fig. 2 and showing the one way pawl, portion of the detent flange of the sleeve which it engages, and the pawl releasing cam which is fitted on the finger lever spindle;

Fig. 5 is a fragment elevational view corresponding with Fig. 3 showing the finger lever moved over and the one way pawl out of engagement with the detent flange of the sleeve.

Figure 7:
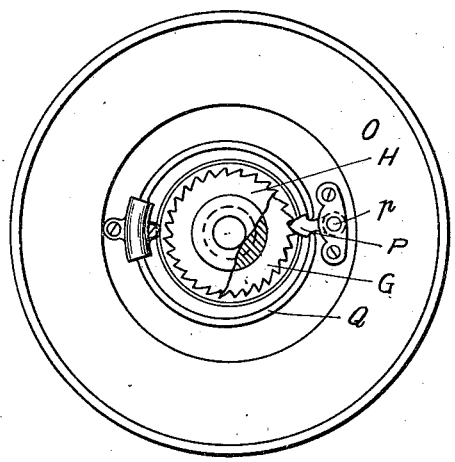
Fig. 7 is an end elevational view of the drum showing the click pawl and its spring.
Figure 6:
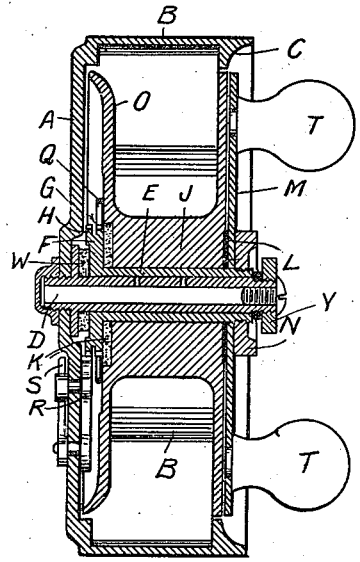
Fig. 6 is a vertical section through the reel.

The frame consists of a back plate A with lantern sides B and a face ring C. On the back plate A is mounted the hollow spindle D, the core of which forms an oil chamber which connects through oil holes with the bearing surfaces on which the sleeve E turns. Said sleeve terminates at its back end in a collar flange F, the periphery of which is double toothed to engage the click pawl and the one way pawl. Between the flange F and the hub portion J of the drum a cork washer K is set. At the other side of the drum hub a metal washer L is set. The washer L is locked by castellations, flats, or a feather to the sleeve E, so that it is non-rotatable but is slidable endwise thereon. The winding crank M is non-rotatably but otherwise freely mounted on the sleeve E, and a tension button N is screwed on to said sleeve E; when the tension button N is screwed home it compresses the lever arm M, the washers K and L, and the drum hub J more or less tightly together. The drum O is then rotatable relatively to the sleeve E, subject to the degree of frictional grip of the cork washer K due to this compression. When the thumb nut N is eased, the drum O may run freely on the sleeve E, but when the said nut is tightened up, the drum can turn relatively to the sleeve E only when considerable force is applied to it, the washers being then pressed tightly against the drum cheeks, and braking the movement of the drum relatively to the sleeve and the winding crank.

The inner part G of the detented edge of the flange F engages the click pawl P which is centered at $p$ on the cheek of the drum. This pawl is normally kept at central position by a bow wire spring Q. The detent teeth running over the point of the pawl P when the locking pawl R is engaged with the said teeth produce a clicking sound, the pitch of which determines to the angler the speed at which the drum O is turning relatively to the sleeve E, that is to say, the speed at which the line is paying out.

The sleeve E may turn only positively unless the locking pawl R is disengaged by moving the finger lever S from the position shown in Fig. 3 to the position shown in Fig. 5. In the latter position, the drum and sleeve E run as one unit on the spindle D to allow the lure to "run out" while "trolling".

For "casting" the line, it is necessary, however, that sufficient retardation should be imposed on the free rotation of the sleeve and the drum to prevent over-spinning and subsequent back winding and tangling of the line. This retardation is imposed by means of a small friction washer W of cork contained between the seating flange of the hollow spindle D and the outer side of the sleeve flange F. Pressure is applied to this washer by a tension nut Y running on the end of the hollow spindle D and bearing against the end of the sleeve E.

The fish is played by varying the tension of the drum clutch by means of the nut N, whereby greater or less braking resistance is imposed on the turning of the drum O relatively to the sleeve, so that the line is held under more or less tension. If while the clutch is engaged the hand crank T be rotated positively, the drum will be turned positively and wind in the line whenever the tension on the line is less than the tension corresponding with the frictional grip between the clutch washers and the drum cheeks. The angler may therefore continue to turn the hand crank, having first adjusted the tension nut N, and then the line will be wound in when the pull of the fish is less than the regulated clutch tension, but when the pull exceeds the clutch tension the drum turns negatively and the line pays out notwithstanding that the hand crank is still being turned positively.

For casting the line, the clutch is engaged and the brake W adjusted by the nut X and the pawl R disengaged. The drum then turns freely, allowing the line to run out, but the drum does not spin so as to backwind or tangle the line.

Figure 8:
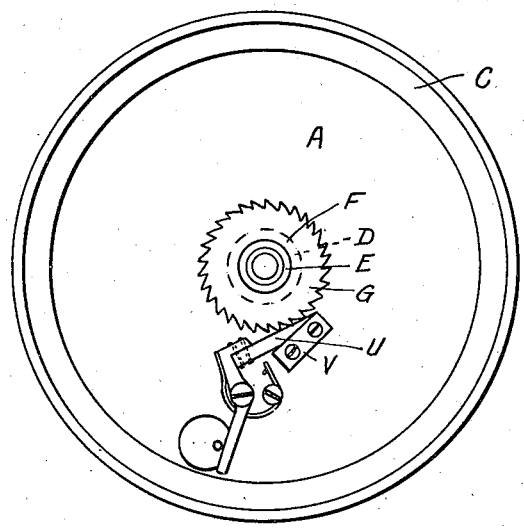
Fig. 8 is an elevational view corresponding with Fig. 4 illustrating an alternative one way pawl mechanism for engaging the flange of the sleeve.

In the alternating construction of one way or locking pawl indicated in Fig. 8, a hard leather check pawl U with angular edge adapted to slide on a pillow block V takes the place of the tooth pawl R shown in other figures. Negative turning movement applied to the drum then causes the detent teeth H to bite into the leather U and so lock the detented sleeve flange. When, however, the lever S is turned (see Fig. 5) the leather chock pawl U is withdrawn, and then the sleeve E may rotate in a negative direction on the spindle D.

I have not illustrated gearing mechanism between the hand crank T and the drum for the purpose of multiplying the winding rotations of the hand crank. Gearing for that purpose is well known, and may be used in combination with the features disclosed in the present specification.

What I claim as my invention and desire to secure by Letters Patent is:—

1. A fishing reel comprising an open side lantern housing fitted with a fixed hollow spindle, a sleeve rotatable thereon with a detent edge collar flange at one end of it, a cork washer abutting against said flange, a slidable non-rotatable metal washer and a winding crank M carried on the other end of said sleeve and axially adjustable thereon, a tension adjusting nut screwed on the outer end of said sleeve and adapted to apply compression to said washers to frictionally engage said drum to said sleeve therethrough, a reverse check pawl mounted on the back of the housing and normally engaged with the detent edge of the sleeve collar flange, a release device for disengaging said pawl and thus freeing said drum and sleeve on said spindle and a two way click pawl mounted on the housing and engaging the detent edge of the sleeve collar flange.

2. In a fishing reel, the combination of a housing, a fixed spindle therein, a sleeve mounted on said spindle and having a flange at one end thereof, a drum mounted on said sleeve, a friction member interposed between one face of said drum and one face of said flange, a second friction member interposed between the other face of said flange and one end of said spindle, and means respectively for regulating the friction between said friction members and their contiguous parts.

In testimony whereof I have signed my name to this specification in the presence of two subscribing witnesses.

EHENREICH PHILLIP ANDREAS.

Witnesses:
G. GARDNER,
W. J. HUMPHREYS.